United States Patent Office 3,012,993
Patented Dec. 12, 1961

3,012,993
BRANCHED CHAIN POLYURETHANE POLYMERS
John B. Rogan, Christiana Hundred, Del., assignor to E. I. du Pont de Nemours and Company, Wilmington, Del., a corporation of Delaware
No Drawing. Filed Apr. 21, 1958, Ser. No. 729,518
3 Claims. (Cl. 260—77.5)

This invention relates to novel polyurethane polymers which are capable of being cured to form highly useful elastomers.

Heretofore it has been the usual practice in preparing polyurethane elastomeric condensation products to react a high molecular weight compound, such as a polymeric glycol, with a molar excess of a diisocyanate, followed by a chain extension step and subsequently a curing step with the curing agent being selected on the basis of the curing or cross linking sites on the polyurethane polymer. The degrees of cure obtained as defined by modulus may vary within wide limits, however the resilience of the cured elastomer will also vary. Thus the resilience will be low with a low state of cure and high with a high state of cure.

It is an object of the present invention to provide novel polyurethane polymers. A further object is to provide polyurethane polymers containing curing or cross linking sites. A still further object is to provide novel polyurethane polymers which can be cured to obtain a range of degrees of cure while maintaining a constant resilience. Another object is to provide a process for the preparation of these polyurethane polymers. Other objects will appear hereinafter.

These and other objects of this invention are accomplished by providing novel polyurethane polymers having at least one urethane linkage, —NHCOO—, for each 250 to 1,500 molecular weight units of polymer and at least one branching point for each 5,000 to 50,000 units of molecular weight of polymer, with said polymers being prepared by reacting an essentially stoichiometrically equivalent amount of an organic diisocyanate with a mixture of a monohydroxyl compound, a dihydroxyl compound and a trihydroxyl compound, with said monohydroxyl compound containing a curing or cross linking site in order that the polymers may be cured to form highly useful elastomers. More particularly these polymers are prepared by reacting the diisocyanate with the hydroxyl compound mixture in an amount so as to provide essentially one isocyanate group for each hydroxyl group with the ratio of hydroxyl compounds in said mixture being such that there is a molar ratio of dihydroxyl compound to monohydroxyl compound of between about 1:1 and 12:1 and a molar ratio of said trihydroxyl compound to monohydroxyl compound of between about 0.3:1 and 0.7:1. The monohydroxyl component of this mixture contains curing or cross linking site such as a conjugated double bond system and the resulting polymer can, therefore, be cured to form highly useful elastomers.

The novel polyurethane polymers of this invention are prepared by reacting a stoichiometrically equivalent amount of an organic diisocyanate with a hydroxyl compound mixture. By stoichiometrically equivalent as used throughout the specification and claims, is meant an amount of diisocyanate which will provide one isocyanate group for each hydroxyl group in the hydroxyl compound mixture. In preparing these polymers, a homogeneous mixture of the hydroxyl compounds is made and to this is added the organic diisocyanate, usually at a temperature between about 70 and 120° C. It is to be understood that lower or higher temperatures may be employed. It is desirable that moisture be excluded from the reaction vessel in order to prevent the diisocyanate from reacting with water and it is preferable to employ any of the well-known catalysts which are used for reaction of a hydroxyl group with an isocyanate group. Representative catalysts include compounds such as triethylamine, diethylcyclo-hexylamine, pyridine, quinoline, ferric acetyl acetonate, etc.

Any of a wide variety of diisocyanates may be used in preparing these polymers including aromatic, aliphatic and cycloaliphatic types, as well as combinations of any of these. Representative compounds include 2,4-tolylenediisocyanate, m-phenylenediisocyanate, 4-chloro-1,3-phenylenediisocyanate, 4,4'-diphenylenediisocyanate, 1,5-naphthalenediisocyanate, 1,4-tetramethylenediisocyanate, 1,6-hexamethylenediisocyanate, 1,10 - decamethylenediisocyanate, 1,4-cyclohexenediisocyanate, 4,4'-methylene-bis(cyclohexylisocyanate), nitrobenzidenediisocyanate, and 1,5 - tetrahydromethylenediisocyanate. Arylene diisocyanates, that is, those in which each of the two isocyanate groups is attached directly to an aromatic ring are preferred.

As mentioned above, the hydroxyl compound mixture is made up of a monohydroxyl compound, a dihydroxyl compound or glycol and a trihydroxyl compound in specified molar proportions. The dihydroxyl compound or glycol should have a molecular weight of from about 750 to about 3,000 and have each hydroxyl group attached to a hydrogen bearing carbon atom. The glycols useful in this invention are the polyether glycols, preferably polyalkyleneether glycols. These glycols may be represented by the general formula $H(OX)_nOH$, wherein X is an alkylene radical which need not necessarily be the same and $n$ is an integer so as to provide a molecular weight of from about 750 to 3,000. It is preferred that the glycol have a molecular weight of from about 900 to 1,100. Representative compounds include polyethyleneether glycol, polypropyleneether glycol, polytetramethyleneether glycol, polymethyleneethyleneether glycol, polydecamethyleneether glycol, etc. These glycols may be prepared by any of the well-known methods, such as the alkaline polymerization of ethylene oxide, the acid polymerization of tetrahydrofuran or the catalytic dehydration of the monomeric glycol.

Instead of utilizing a polyalkyleneether glycol, it is possible to use other polyether glycols, such as a polyalkyleneether-thioether glycol, which compound has a general formula similar to the polyalkyleneether glycol general formula recited above except that some of the ether oxygens are replaced with sulfur atoms. These compounds likewise should have a molecular weight of from about 750 to 3,000 and may be conveniently prepared by the reaction of a compound such as thiodiglycol with ethylene glycol in the presence of a catalytic amount of p-toluene sulfonic acid. Other polyether glycols, such as polyalkylene-arylene ether glycols may be used. It is to be understood that mixtures of two or more glycols may be used.

The trihydroxyl component of the hydroxyl compound mixture which is used in the present invention may be any aliphatic or aromatic compound having three hydroxyl groups which are attached to a carbon atom containing at least one hydrogen atom, i.e., each hydroxyl group should be attached to either a $CH_2$ or a CH group. As with the other hydroxyl components of this mixture, this compound should not contain any substituents other than the hydroxyl groups which are reactive with the isocyanate groups. Representative compounds include 1,1,1-trimethylolethane, trimethylolpropane, glycerol, trimethylolbenzene, 1,2,6-trihydroxyhexane, etc. The trihydroxyl component provides the branching points in the novel polyurethane polymers of this invention and, as noted above, there should be at least one of these branching points for each 5,000 to 50,000 units of molecular weight of polymer. Thus, the molecular weight of the trihydroxyl component is only critical insofar as the above limitation is concerned as well as the fact that there be at least one urethane linkage for each 250 to 1,500 molecular weight units of polymer.

The monohydroxyl component of the hydroxyl mixture which is used in the present invention may be any aliphatic or aromatic compound. Here again it is necessary that this compound contain no other groups other than the hydroxyl groups which are reactive with isocyanate groups. In addition to the hydroxyl group, it is necessary that this compound contain a curing or cross linking site such as a conjugated carbon to carbon double bond system. Representative monohydroxyl compounds include 2,4-hexadiene-1-ol and β(9-anthracyl)ethanol.

It is to be understood that instead of the conjugated carbon to carbon double bonds, the monohydroxyl compounds may contain a single carbon to carbon aliphatic double band which would serve as a curing site. In this instance, a sulfur curing procedure could be employed; however, the advantages of being able to obtain a range of states of cure while maintaining a constant resilience are not as pronounced when a sulfur cure has been used.

The amount of hydroxyl compound mixture to be used in the present invention should be such so as to provide one hydroxyl group for each isocyanate group of the organic diisocyanate reactant. The relative amounts of the hydroxyl compounds themselves should be such so that the ratio of the glycol to the monohydroxyl compound be between about 1:1 and 12:1, with a preferred ratio of about 4:1 to 10:1. It has been determined that if this ratio of 12:1 is exceeded the resulting polyurethane polymer has a low tensile strength; whereas, if the ratio is below about 1:1, the polyurethane polymer tends to be more of a plastic material rather than an elastomer.

The amount of trihydroxyl compound should be selected so that the ratio of it to the monohydroxyl compound is between 0.3:1 and 0.7:1. It has been determined that if this ratio is below about 0.3:1, the polymer tends to be soft and tacky and difficult to process; whereas, if the ratio is above 0.7:1, the polymer obtained is tougher than desired.

In preparing the novel polyurethane polymers of this invention the isocyanate groups of the diisocyanate react with the hydroxyl group to form urethane linkages. As noted above, there should be least one of these urethane linkages formed for every 250 to 1,500 molecular weight units of polymer with a preferred ratio of about one urethane linkage for every 400 to 1,000 molecular weight units. As the diisocyanate reacts with the hydroxyl compound mixture, chain elongation takes place due to reaction with the glycol and trihydroxyl compound. As the trihydroxyl compound reacts with the diisocyanate branching points will also be formed, and these points may be represented as follows:

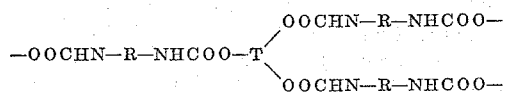

wherein T is the trihydroxyl compound residue and R is the organic diisocyanate residue. There should be at least one of these branching points for every 5,000 to 50,000 molecular weight units of polymer, with a preferred range of from about 7,000 to 15,000 molecular weight units. The monohydroxyl compound, since it is monofunctional insofar as reaction with the diisocyanate is concerned, acts as a chain terminating agent, and introduces the curing or cross-linking site on the chain ends of polyurethane polymer.

The novel polyurethane polymers of this invention which contain the conjugated carbon to carbon double bond system may be cured to form highly useful elastomers by using a compound such as a bismaleimide according to the well known Diels-Alder reaction. Representative compounds which may be used include m-phenylene bismaleimide, toluene-2,4-bismaleimide, biphenylene-4,4'-bismaleimide and diphenylsulfone-3,3'-bismaleimide. The curing procedure involving the Diels-Alder reaction may be carried out by compounding the polyurethane polymer with the bismaleimide and heating to a temperature of from about 125 to 160° C. for from one-half to several hours. In addition to the bismaleimide various compounding or reinforcing agents such as carbon black, silica, pigments, etc. may be employed.

The elastomers which are obtained as a result of curing the novel polymers of this invention have many varied uses. They may be employed in the preparation of tires, inner tubes, hose, footwear, coated fabrics and a wide variety of coated or molded articles.

The cured elastomers display properties which are completely contrary to accepted tradition in the elastomer field in that a range of states of cure, as represented by modulus, may be obtained while maintaining a rather constant resilience. The particular state of cure can be varied by adjusting the amount of trihydroxyl compound used since this compound introduces the branching points into the polymer network. The dynamic behavior of an elastomer is determined, in part, by the resilience. The higher the resilience, the more "snappy" or "rubbery." In general, low modulus means low stiffness.

The following examples will better illustrate the nature of the present invention; however, the invention is not intended to be limited to these examples. Parts are by weight unless otherwise indicated.

The general procedure employed in the examples is as follows: The monohydroxyl compound, the glycol and trihydroxyl compound are placed in a dry reactor and these reagents are warmed to about 80–100° C. with agitation to insure a homogeneous solution which is then cooled to about 20–50° C. and the stoichiometric amount of diisocyanate is quickly added all at once followed by a reaction catalyst usually in the amount of 0.02 weight percent on the weight of the reagents. The catalyst used is an equal mixture of ferric acetyl acetonate and triethylamine in an acetone solution. The mixture is agitated thoroughly for about 30 seconds at ambient temperature and the liquid is then held at 80° C. for about 12 to 20 hours in the absence of air or moisture.

Example 1

To a solution of 0.98 part of 2,4-hexadiene-1-ol, 0.40 part of trimethylolpropane, and 118.5 parts of polytetramethyleneether glycol having a molecular weight of 987 is added 22.55 parts of toluene-2,4-diisocyanate followed by 3 drops 10% triethylamine in acetone and 6 drops of 5% ferric acetyl-acetonate dissolved in acetone. The reaction mixture is vigorously shaken until homogeneous and then held at 80° C. for 16 hours. The product has an intrinsic viscosity of 1.01 in tetrahydrofuran-dimethylformamide at 80° C., one urethane group per 548 molecular weight units and one branching point, from the trimethylol propane, per 47,500 molecular weight units. This polymer is cured with 0.95 part of m-phenylene bismaleimide and 30 parts of carbon black by heating at 140° C. for 60 minutes. The cured elastomer has the following properties:

Tensile strength at the break at 25° C_____p.s.i__ 3900
Modulus at 300% elongation at 25° C_____p.s.i__ 750
Yerzley resilience_____percent__ 57
Elongation at the break at 25° C_____do____ 730
Compression set_____ [1] 52
Shore hardness_____ 62

[1] 70° C./24 hrs.

Example 2

A polymer is prepared as in Example 1 using 3.18 parts of 2,4-hexadiene-1-ol, 1.96 parts of trimethylol propane, 125.4 parts of polytetramethyleneether glycol having a molecular weight of 965, and 29.30 parts of toluene-2,4-diisocyanate. The polymer has a Mooney viscosity (ML–4, 212° F.) of 22, 11,000 molecular weight units per branch point and 475 molecular weight units per urethane group. On compounding with 30 parts carbon black and 2.8 parts of m-phenylene bismaleimide and curing at 140° C. for 60 minutes, the following properties in the cured stock are observed:

| | |
|---|---:|
| Tensile strength at the break at 25° C._____p.s.i. | 4750 |
| Modulus at 300% elongation at 25° C._____p.s.i. | 3100 |
| Yerzley resilience_____percent | 71 |
| Elongation at the break at 25° C._____do | 390 |
| Compression set | 17 |
| Shore hardness | 70 |

Example 3

A polymer is prepared as in Example 1 using 0.98 part of 2,4-hexadiene-1-ol, 0.536 part of 1,1,1-trimethylol propane, 57.9 parts of polytetramethyleneether glycol having a molecular weight of 965 and 12.35 parts of toluene-2,4-diisocyanate. The resulting polyurethane polymer has 17,850 molecular weight units per branch point and 505 molecular weight units per urethane group and is cured with 30 parts of carbon black and 1.88 parts of m-phenylene bismaleimide by heating at 140° C. for 60 minutes. The cured elastomer has the following properties:

| | |
|---|---:|
| Tensile strength at the break at 25° C._____p.s.i. | 5100 |
| Modulus at 300% elongation at 25° C._____p.s.i. | 1900 |
| Yerzley resilience_____percent | 70 |
| Elongation at the break at 25° C._____do | 500 |
| Compression set | 26 |
| Shore hardness | 68 |

This example illustrates a low modulus with relatively high resilience.

Example 4

A polymer is prepared as in Example 1 using 0.98 part of 2,4-hexadiene-1-ol, 0.74 part of 1,1,1-trimethylol propane, 48.2 parts of polytetramethyleneether glycol having a molecular weight of 965 and 11.1 parts of toluene-2,4-diisocyanate. The resulting polyurethane polymer has 11,100 molecular weight units per branch point and 481 molecular weight units per urethane group and is cured with 30 parts of carbon black and 2.20 parts of m-phenylene bismaleimide by heating at 140° C. for 60 minutes. The cured elastomer has the following properties:

| | |
|---|---:|
| Tensile strength at the break at 25° C._____p.s.i. | 3930 |
| Modulus at 300% elongation at 25° C._____p.s.i. | 3600 |
| Yerzley resilience_____percent | 73 |
| Elongation at the break at 25° C._____do | 320 |
| Compression set | 18 |
| Shore hardness | 70 |

This example illustrates a high modulus with relatively high resilience.

Example 5

A polymer is prepared as in Example 1 using 0.98 part of 2,4-hexadiene-1-ol, 0.67 part of 1,1,1-trimethylol propane, 49.8 parts of polytetramethyleneether glycol having a molecular weight of 2900 and 5.16 parts of toluene-2,4-diisocyanate. The resulting polyurethane polymer has 955 molecular weight units per urethane group and 1140 molecular weight units per branch point and is cured with 30 parts of carbon black and 2.37 parts of m-phenylene bismaleimide by heating at 140° C. for 60 minutes. The cured elastomer has the following properties:

| | |
|---|---:|
| Tensile strength at the break at 25° C._____p.s.i. | 1670 |
| Yerzley resilience_____percent | 72 |
| Elongation at the break at 25° C._____do | 130 |
| Compression set | 12 |
| Shore hardness | 75 |

Example 6

A polymer is prepared as in Example 1 using 0.98 part of 2,4-hexadiene-1-ol, 0.74 part of 1,1,1-trimethylolpropane, 48.2 parts of polytetramethyleneether glycol having a molecular weight of 965 and 11.1 parts of toluene-2,4-diisocyanate. The polymer has 11,100 molecular weight units per branch point and 481 molecular weight units per urethane group. Portions of this polyurethane polymer were compounded with 30 parts of carbon black and the following parts of m-phenylene bismaleimide:

A. 1.32 parts of m-phenylene bismaleimide (60% theory)
B. 2.20 parts of m-phenylene bismaleimide (100% theory)
C. A.30 parts m-phenylene bismaleimide (150% theory)

Each of these portions of polymer were cured by heating at 140° C. for 60 minutes. The resulting cured elastomers had the following properties:

| | A. | B. | C. |
|---|---:|---:|---:|
| Tensile strength at the break at 25° C., pounds per square inch | 3,650 | 4,300 | 4,300 |
| Modulus at 300% elongation at 25° C., pounds per square inch | 1,450 | 3,000 | 2,700 |
| Yerzley resilience, percent | 55 | 70 | 61 |
| Elongation at the break at 25° C., percent | 500 | 370 | 400 |
| Compression set | 29 | 17 | 26 |
| Shore hardness | 60 | 68 | 67 |

As many widely different embodiments of this invention may be made without departing from the spirit and scope thereof, it is to be understood that this invention is not limited to the specific embodiments thereof except as defined in the appended claims.

I claim:

1. A curable polyurethane polymer having at least one urethane linkage, —NHCOO—, for each 250 to 1500 molecular weight units and at least one branching point for each 5000 to 50,000 molecular weight units, said polymer being prepared by reacting an essentially stoichiometrically equivalent amount of an organic diisocyanate with a mixture of a monohydroxyl compound, a glycol and a trihydroxyl compound with the ratio of hydroxyl compounds in said mixture being such so as to provide a molar ratio of glycol to monohydroxyl compound of between about 1:1 and 12:1 and a molar ratio of trihydroxyl compound to monohydroxyl compound of between about 0.3:1 and 0.7:1; with the proviso that said monohydroxyl compound contian at least one carbon-to-carbon conjugated double bond system which serves as a cross linking site, said monohydroxyl compound being selected from the group consisting of 2,4-hexadiene-1-ol and β(9-anthracyl)ethanol, said glycol having a molecular weight of from about 750 to 3000 and being selected from the group consisting of polyalkyleneether glycols, polyalkyleneether-thioether glycols and polyalkylene-aryleneether glycols, said trihydroxyl compound being an organic compound wherein the 3 hydroxyl groups are attached to carbon atoms which contain at least one hydrogen atom and being selected from the group consisting of 1,1,1-trimethylolethane, trimethylolpropane, glycerol, trimethylolbenzene, and 1,2,6-trihydroxyhexane.

2. A polymer according to claim 1 wherein the organic diisocyanate is toluene-2,4-diisocyanate, the monohydroxyl compouud is 2,4-hexadiene-1-ol, the glycol is a polytetramethyleneether glycol having a molecular weight of at least 750 and the trihydroxyl compound is 1,1,1-trimethylol propane.

3. A cured elastomer obtained by heating the polyurethane polymer of claim 1 with a bismaleimide to a temperature of from about 125 to 160° C.

(References on following page)

References Cited in the file of this patent

UNITED STATES PATENTS

| | | |
|---|---|---|
| 2,764,565 | Hoppe et al. | Sept. 25, 1956 |
| 2,877,193 | Roussel | Mar. 10, 1959 |
| 2,906,738 | Goldberg | Sept. 29, 1959 |
| 2,921,927 | Csendes | Jan. 19, 1960 |
| 2,929,794 | Simon et al. | Mar. 22, 1960 |

FOREIGN PATENTS 769,091    Great Britain _____ Feb. 27, 1957

OTHER REFERENCES

Brewster: "Organic Chemistry," 2nd ed., 1953, Prentice-Hall, New York, page 241.

Mattiello: "Protective and Decorative Coatings," vol. V, 1946, Wiley & Sons, pages 226–228.